(12) United States Patent
Olsen et al.

(10) Patent No.: US 11,472,493 B2
(45) Date of Patent: Oct. 18, 2022

(54) VEHICLE HAVING FASTENER ASSEMBLY

(71) Applicants: Christopher W Olsen, Rochester Hills, MI (US); Aaron R Wilkinson, Royal Oak, MI (US); James M Stevens, Farmington Hills, MI (US); Christopher Cito, Oakland, MI (US)

(72) Inventors: Christopher W Olsen, Rochester Hills, MI (US); Aaron R Wilkinson, Royal Oak, MI (US); James M Stevens, Farmington Hills, MI (US); Christopher Cito, Oakland, MI (US)

(73) Assignee: FCA US LLC, Auburn Hills, MI (US)

( * ) Notice: Subject to any disclaimer, the term of this patent is extended or adjusted under 35 U.S.C. 154(b) by 45 days.

(21) Appl. No.: 17/196,201

(22) Filed: Mar. 9, 2021

(65) Prior Publication Data
US 2022/0289308 A1 Sep. 15, 2022

(51) Int. Cl.
*B62D 27/06* (2006.01)
*B62D 65/12* (2006.01)
*B60G 7/02* (2006.01)

(52) U.S. Cl.
CPC .............. *B62D 27/065* (2013.01); *B60G 7/02* (2013.01); *B62D 65/12* (2013.01); *B60G 2204/41* (2013.01)

(58) Field of Classification Search
CPC ........ B62D 27/065; B62D 65/12; B60G 7/02; B60G 2204/41
See application file for complete search history.

(56) References Cited

U.S. PATENT DOCUMENTS

| | | | | |
|---|---|---|---|---|
| 5,007,781 A | * | 4/1991 | Jensen | F16B 21/16 411/354 |
| 5,967,536 A | * | 10/1999 | Spivey | B60G 17/021 280/124.141 |
| 6,076,840 A | * | 6/2000 | Kincaid | B60G 21/0551 267/188 |
| 6,550,795 B1 | * | 4/2003 | Schlosser | B60G 7/02 280/124.128 |
| 6,561,718 B1 | * | 5/2003 | Archer | B62D 21/11 280/124.1 |
| 7,331,588 B2 | * | 2/2008 | Johnson | B60G 9/00 280/86.754 |
| 7,854,285 B1 | * | 12/2010 | Giese | B62M 27/02 180/193 |
| 8,499,877 B1 | * | 8/2013 | Giese | B62M 27/02 180/193 |

(Continued)

*Primary Examiner* — Darlene P Condra
(74) *Attorney, Agent, or Firm* — Ralph E. Smith (57) ABSTRACT

A vehicle includes a first vehicle component, a second vehicle component, and a fastener assembly. The first vehicle component has a first side defining a first opening and a second side opposite the first side defining a second opening. The second vehicle component is disposed between the first and second sides of the first vehicle component. The fastener assembly attaches the first and second vehicle components to each other and includes a sleeve, a bushing, and a fastener. The sleeve is disposed within the first opening of the first vehicle component. The bushing extends through the second vehicle component and is disposed between the first and second sides of the first vehicle component. The fastener extends through the sleeve, the bushing and the first and second openings of the first vehicle component.

14 Claims, 7 Drawing Sheets

(56) References Cited

U.S. PATENT DOCUMENTS

| | | |
|---|---|---|
| 8,925,944 B2 | 1/2015 | Byrnes |
| 2011/0057371 A1 | 3/2011 | Rezania |
| 2013/0042464 A1* | 2/2013 | Orcutt .................... B60G 7/001 29/525.11 |
| 2017/0129570 A1* | 5/2017 | Mangum ................ B62K 13/00 |

* cited by examiner

VEHICLE HAVING FASTENER ASSEMBLY

FIELD

The present disclosure relates to a vehicle having a fastener assembly.

BACKGROUND

This section provides background information related to the present disclosure and is not necessarily prior art.

Vehicles include fastener assemblies that attach a control arm to a shock. Larger vehicles often require larger fastener assemblies to manage service loads. Larger fastener assemblies require bulky equipment to secure the fastener assemblies to the control arm and the shock, which is not practical due to both physical constraints as well as assembly time constraints.

SUMMARY

This section provides a general summary of the disclosure, and is not a comprehensive disclosure of its full scope or all of its features.

The teachings of the present disclosure provides a fastener assembly that is able to manage service load requirements without increasing the size of the fastener assembly.

In one form, the present disclosure provides a vehicle that includes a first vehicle component, a second vehicle component, and a fastener assembly. The first vehicle component has a first side defining a first opening and a second side opposite the first side defining a second counter sunk opening. The second vehicle component is disposed between the first and second sides of the first vehicle component. The fastener assembly attaches the first and second vehicle components to each other and includes a sleeve, a bushing, and a fastener. The sleeve is disposed within the first opening of the first vehicle component. The bushing extends through the second vehicle component and is disposed between the first and second sides of the first vehicle component. The bushing has a first axial end surface and a second axial end surface. The first axial end surface is tapered to correspond to a tapered surface of the second counter sunk opening and the second axial end surface includes serrations that grip a first axial end surface of the sleeve. The fastener extends through the sleeve, the bushing and the first and second openings of the first vehicle component.

In some configurations of the vehicle of the above paragraph, the sleeve is pressed in the first opening of the first vehicle component.

In some configurations of the vehicle of any one or more of the above paragraphs, the first opening of the first vehicle component has a diameter that is greater than a diameter of the second opening of the first vehicle component.

In some configurations of the vehicle of any one or more of the above paragraphs, the sleeve is made of a metal material.

In some configurations of the vehicle of any one or more of the above paragraphs, an axial end of the sleeve extends into a space defined between the first and second sides of the first vehicle component.

In some configurations of the vehicle of any one or more of the above paragraphs, the first vehicle component is a control arm and the second vehicle component is a shock.

In some configurations of the vehicle of any one or more of the above paragraphs, the fastener includes a head and a shaft extending from the head. The head abuts against an axial end surface of the sleeve.

In some configurations of the vehicle of any one or more of the above paragraphs, an outer diameter of the sleeve is substantially equal to an outer diameter of the bushing.

In another form, the present disclosure provides a method for assembling a first vehicle component to a second vehicle component. The method includes positioning the second vehicle component between a space defined by first and second sides of the first vehicle component; inserting a bushing through a first opening in the first side of the first vehicle component and through the second vehicle component; pressing a sleeve into the first opening in the first side of the first vehicle component after the bushing is inserted through the first opening and through the second vehicle component; and inserting a fastener through the sleeve, the bushing, the first opening and a second counter sunk opening in the second side of the first vehicle component. The bushing abuts against the second side of the first vehicle component. The bushing has a first axial end surface and a second axial end surface. The first axial end surface is tapered to correspond to a tapered surface of the second counter sunk opening and the second axial end surface includes serrations that grip a first axial end surface of the sleeve.

In some configurations of the method of the above paragraph, the first opening of the first vehicle component has a diameter that is greater than a diameter of the second opening of the first vehicle component.

In some configurations of the method of any one or more of the above paragraphs, an axial end of the sleeve extends into a space defined between the first and second sides of the first vehicle component.

In some configurations of the method of any one or more of the above paragraphs, the first vehicle component is a control arm and the second vehicle component is a shock.

In some configurations of the method of any one or more of the above paragraphs, the fastener includes a head and a shaft extending from the head. The head abuts against an axial end surface of the sleeve.

In some configurations of the method of any one or more of the above paragraphs, an outer diameter of the sleeve is substantially equal to an outer diameter of the bushing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
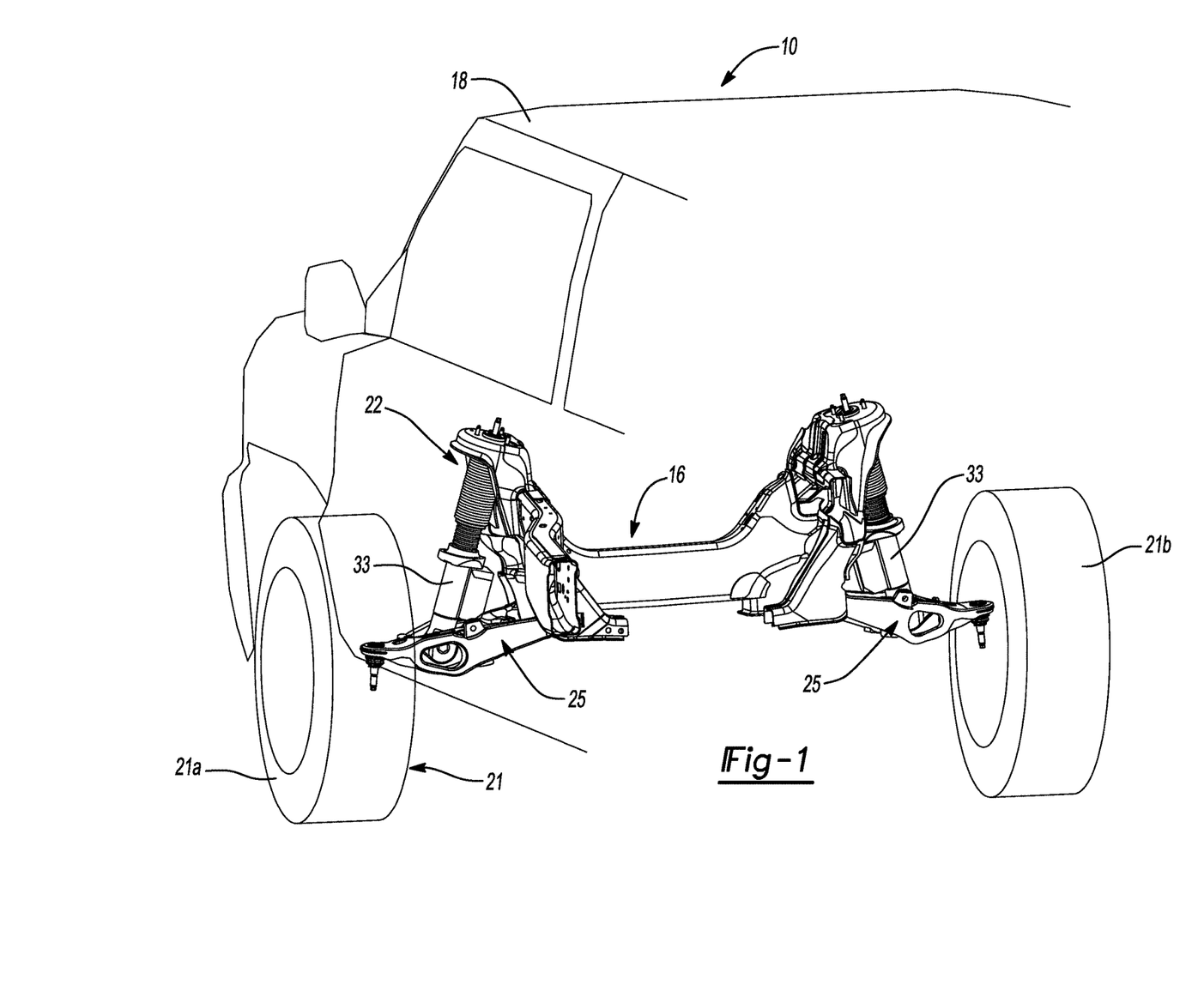
FIG. 1 is a partial perspective view of a vehicle having a front sub frame and a fastener assembly according to the principles of the present disclosure.
Figure 2:
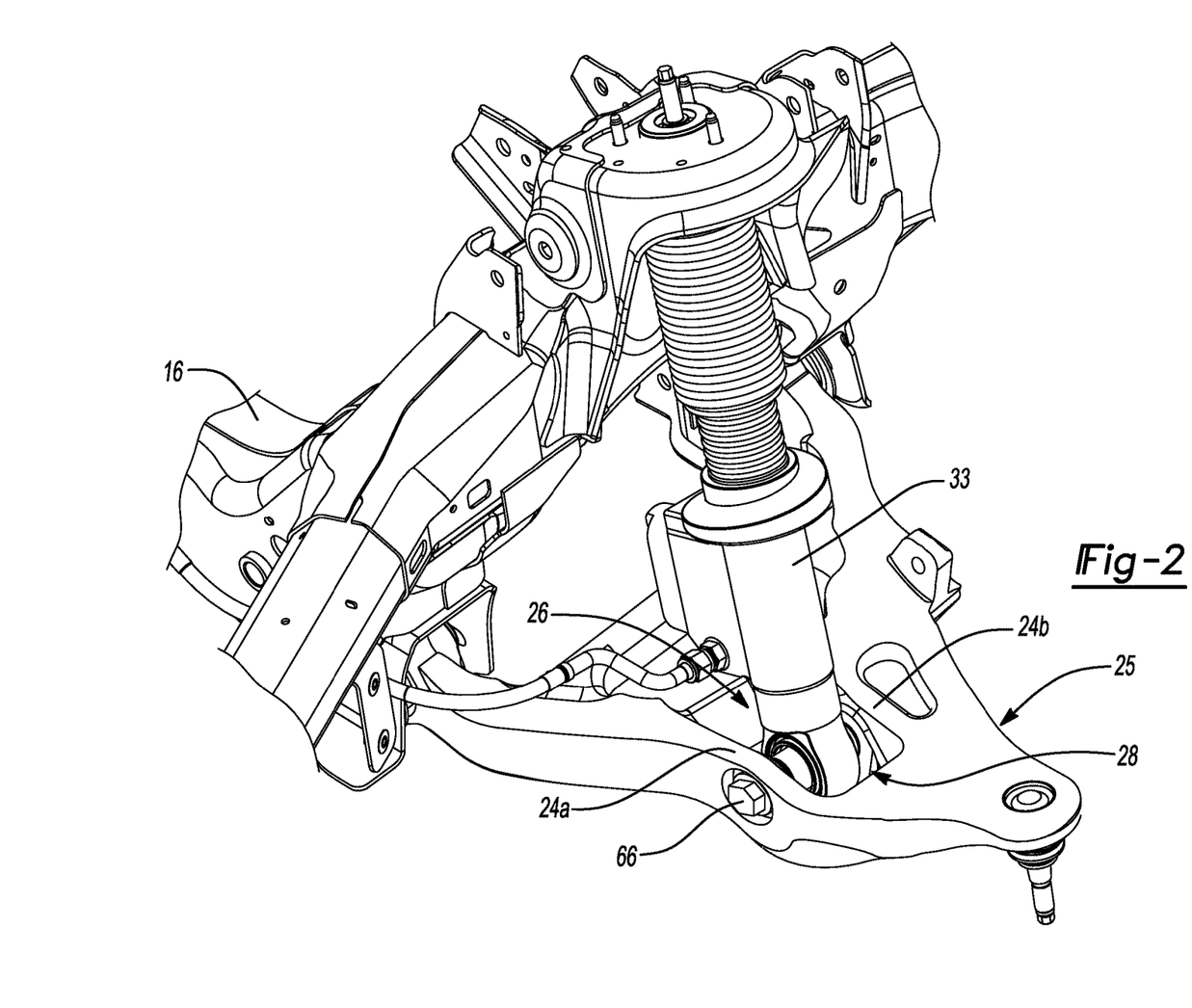
FIG. 2 is a perspective view of a portion of the front sub frame of the vehicle of FIG. 1.

As shown in FIG. 1, a vehicle 10 is provided. The vehicle 10 includes a mainframe or chassis (not shown), a front sub frame 16 and a rear sub frame (not shown). The mainframe supports, inter alia, a vehicle body 18 and can at least partially support a powertrain system (not shown) and a drivetrain system (not shown). Rotary power generated by the powertrain system is transmitted to the drivetrain system to drive at least one of a set of front wheels 21 (comprising wheels 21a, 21b) and a set of rear wheels (not shown). The front sub frame 16 is attached to the mainframe at a front end thereof and at least partially supports the powertrain system and a front suspension system 22. The rear sub frame is attached to the mainframe at a rear end thereof and at least partially supports the drive train system and a rear suspension system (not shown).

A pair of lower control arms 25 (vehicle components) are attached to a respective front wheel 21a, 21b (via a wheel assembly) at one end and attached to the front sub frame 16 at another end. With reference to FIGS. 2-9, each control arm 25 includes a shock-attachment portion 28 having opposing sidewalls 24a, 24b and a bottom wall 29 (FIG. 9) that cooperate to define a space 26. The sidewall 24a includes an opening 31a formed therein, and the sidewall 24b includes an opening 31b formed therein. The openings 31a, 31b of the sidewalls 24a, 24b, respectively, are aligned with each other. A diameter D1 of the opening 31a of the sidewall 24a is greater than a diameter D2 of the opening 31b of the sidewall 24b. The opening 31b of the sidewall 24b is also counter sunk. The diameter D1 is greater than the diameter D2 to permit the opening 31b to be machined to be counter sunk.

Figure 3:
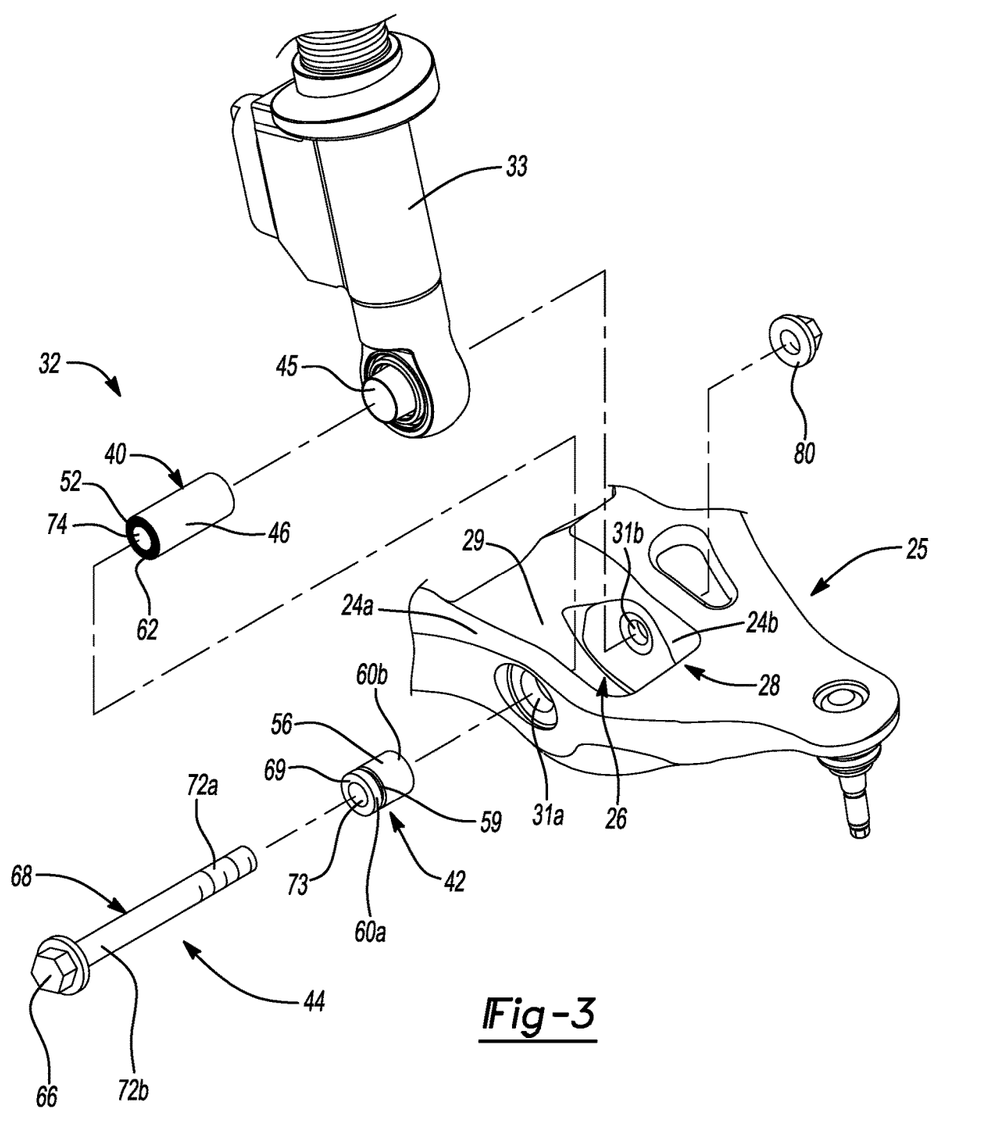
FIG. 3 is an exploded view of the fastener assembly.
Figure 4:
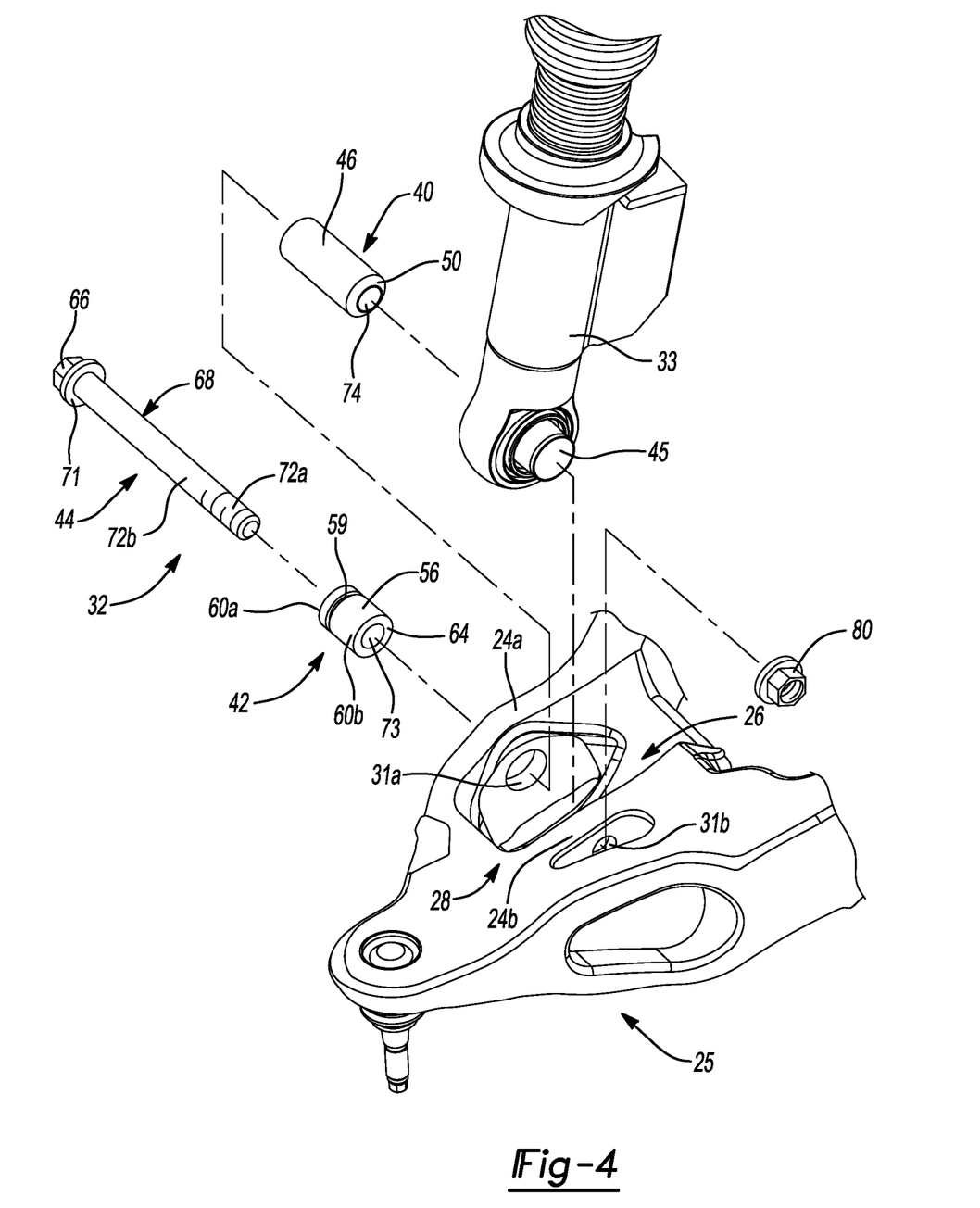
FIG. 4 is another exploded view of the fastener assembly.

As shown in FIGS. 3 and 4, a fastener assembly 32 couples a respective shock or vehicle component 33 to a respective control arm 25. That is, the respective shock 33 is positioned in the space 26 defined by the sidewalls 24a, 24b, and the fastener assembly 32 extends through both the respective shock 33 and the respective control arm 25, thereby coupling the respective shock 33 and the respective control arm 25 to each other.

Figure 9:
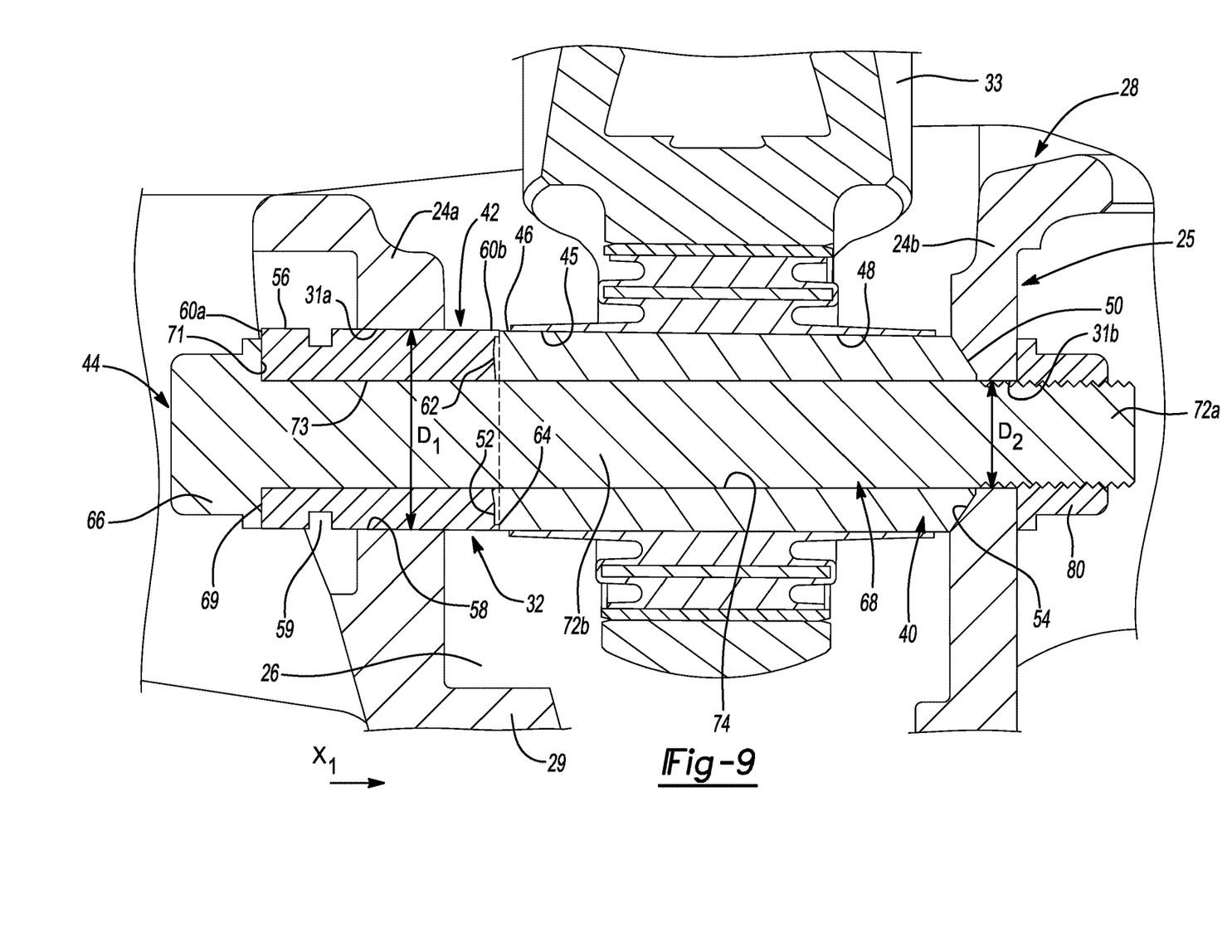
FIG. 9 is a cross-sectional view of the control arm taken along line 9-9 of FIG. 8.

Each fastener assembly 32 includes a bushing 40, a sleeve 42, and a fastener 44 (e.g., a bolt or screw). The bushing 40 is cylindrically-shaped and is coupled to the respective shock 33 and the respective control arm 25. The bushing 40 extends through an opening 45 in a lower end of the shock 33 such that an outer cylindrical surface 46 of the bushing 40 contacts an inner cylindrical surface 48 of the shock 33 (FIG. 9). The bushing 40 also includes a first axial end surface 50 and a second axial end surface 52 that is opposite the first axial end surface 50. The first axial end surface 50 is tapered to correspond to a tapered surface 54 of the countersunk opening 31b (the first axial end surface 50 abuts against the tapered surface 54 of the counter sunk opening 31b). In this way, attachment between the bushing 40 and the control arm 25 is facilitated, and enhanced due to a taper lock being formed between the first axial end surface 50 and the tapered surface 54.

The sleeve 42 is cylindrically-shaped and is made of a metal material (e.g., aluminum or steel). The sleeve 42 is disposed (e.g., pressed) within the first opening 31a of the sidewall 24a of the control arm 25 (an outer cylindrical surface 56 of the sleeve 42 contacts an inner cylindrical surface 58 of the opening 31a of the sidewall 24b (FIG. 9)). A groove 59 is formed in and extends 360 degrees around the outer cylindrical surface 56 of the sleeve 42. The groove 59 allows the sleeve 42 to be conveniently removed in service if the shock 33 needs to be replaced, for example. That is, the sleeve 42 needs to be backed out to release the clamp load on the inner metal of the shock 33 to allow the shock 33 to be removed. The sleeve 42 has a first axial end 60a and a second axial end 60b that is opposite the first axial end 60a. The second axial end 60b extends at least partially into the space 26 defined by the opposing sidewalls 24a, 24b. The second axial end surface 52 of the bushing 40 includes serrations 62 that contact an axial end surface 64 of the second axial end 60b of the sleeve 42. In this way, attachment of the sleeve 42 and the bushing 40 is facilitated and enhanced. An outer diameter of the sleeve 42 is substantially equal to an outer diameter of the bushing 40.

The fastener 44 includes a head 66 and a shaft 68 that extends from the head 66. The head 66 abuts against an axial end surface 69 of the first axial end 60a of the sleeve 42 (an inner surface 71 of the head 66 abuts against the axial end surface 69 (FIG. 9)). The shaft 68 extends through the sleeve 42, the bushing 40, and the first and second openings 31a, 31b of the sidewalls 24a, 24b, respectively, and includes a threaded portion 72a and an unthreaded portion 72b. That is, the shaft 68 extends through a central opening 73 of the sleeve 42, a central opening 74 of the bushing 40, and the first and second openings 31a, 31b of the sidewalls 24a, 24b, respectively (the unthreaded portion 72b of the shaft 68 contacts an inner diametrical surface of the sleeve 42 and an inner diametrical surface of the bushing 40). A nut 80 is threadably engaged to the threaded portion 72a of the shaft 68. In this way, the fastener assembly 32 connects the control arm 25 and the shock 33 to each other.

With the above configuration, increased service loads can be managed without increasing the size of the fastener 44. In this regard, use of bushing 40 and sleeve 42 permits use of a fastener 44 that is not enlarged to manage increased service loads. In addition, the tapered lock between tapered surface 54 and first axial end surface 50 of bushing 40, as well as the serrated interface between bushing 40 and sleeve 42 increases the clamp load between control arm 25 and shock 33.

With continued reference to FIGS. 1-9, a method for assembling the shock 33 and the control arm 25 using the fastener assembly 32 will now be described in detail. It should be understood that although the method will describe in detail the assembly of one of the shocks 33 to a respective control arm 25, the other shock 33 can be assembled to a respective control arm 25 using the same or similar method.

Figure 5:
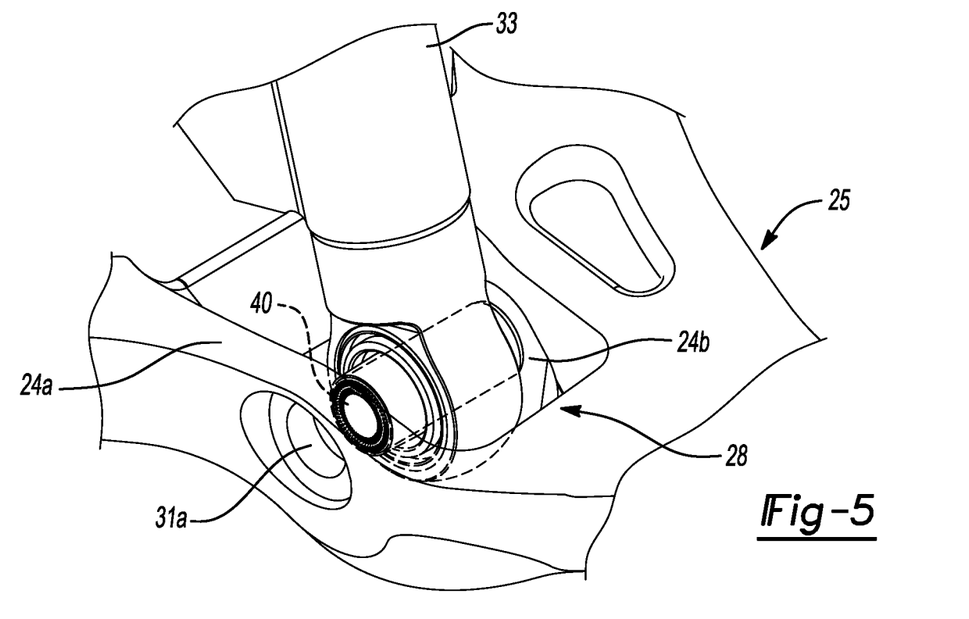
FIG. 5 is a partial perspective view of the control arm showing a bushing of the fastener assembly being inserted through an opening in a sidewall of the control arm and through the shock.

First, as shown in FIG. 5, the shock 33 is positioned in the space 26 of the control arm 25 and the bushing 40 is inserted from the sidewall 24a through the opening 31a of the sidewall 24a and the opening 45 of the shock 33 until the first axial end surface 50 abuts against the tapered surface 54 of the counter sunk opening 31b.

Figure 6:
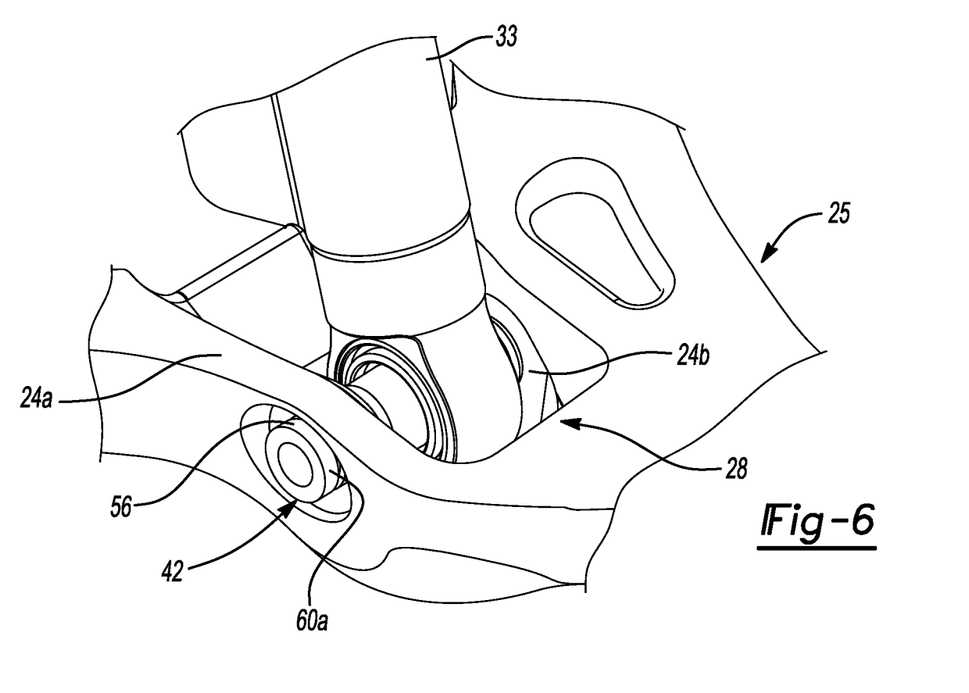
FIG. 6 is a partial perspective view of the control arm showing a sleeve of the fastener assembly being pressed into the opening in the sidewall of the control arm.

Next, as shown in FIG. 6, the sleeve 42 is pressed within the opening 31a of the sidewall 24a so that the second axial end 60b extends at least partially into the space 26 defined by the opposing side walls 24a, 24b and the serrations 62 on the second axial end surface 52 abut against the axial end surface 64 of the sleeve 42.

Figure 7:
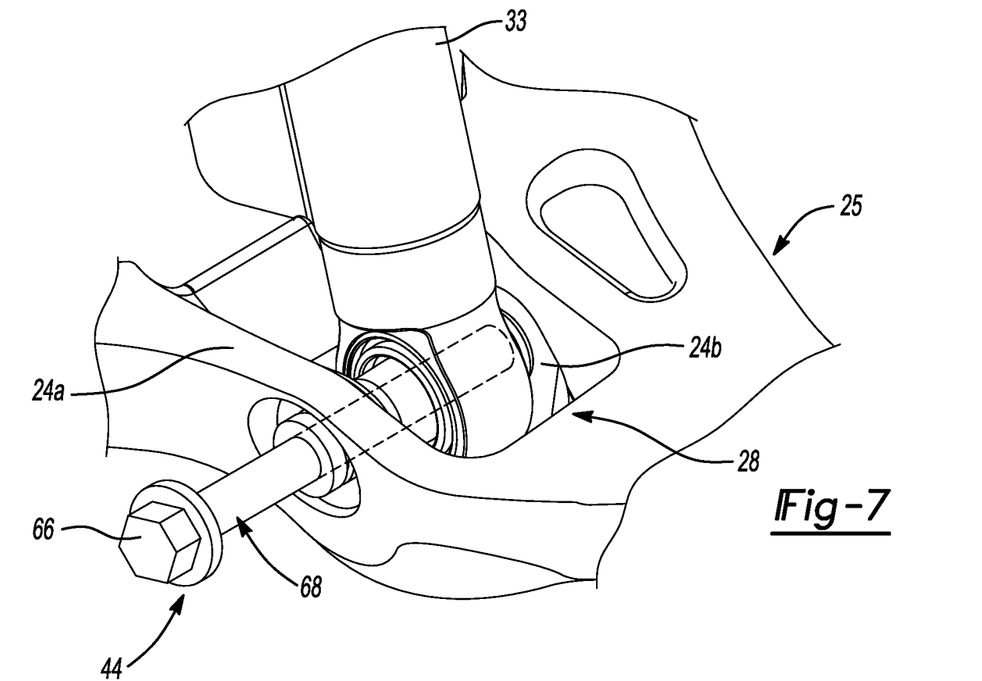
FIG. 7 is a partial perspective view of the control arm showing a fastener of the fastener assembly being inserted through the control arm, the bushing, the sleeve and the shock.

Next, as shown in FIG. 7, the fastener 44 is inserted through the sleeve 42, the bushing 40, and the first and second openings 31a, 31b of the sidewalls 24a, 24b, respectively (the head 66 abuts against the axial end surface 69 of the first axial end 60a of the sleeve 42).

Figure 8:
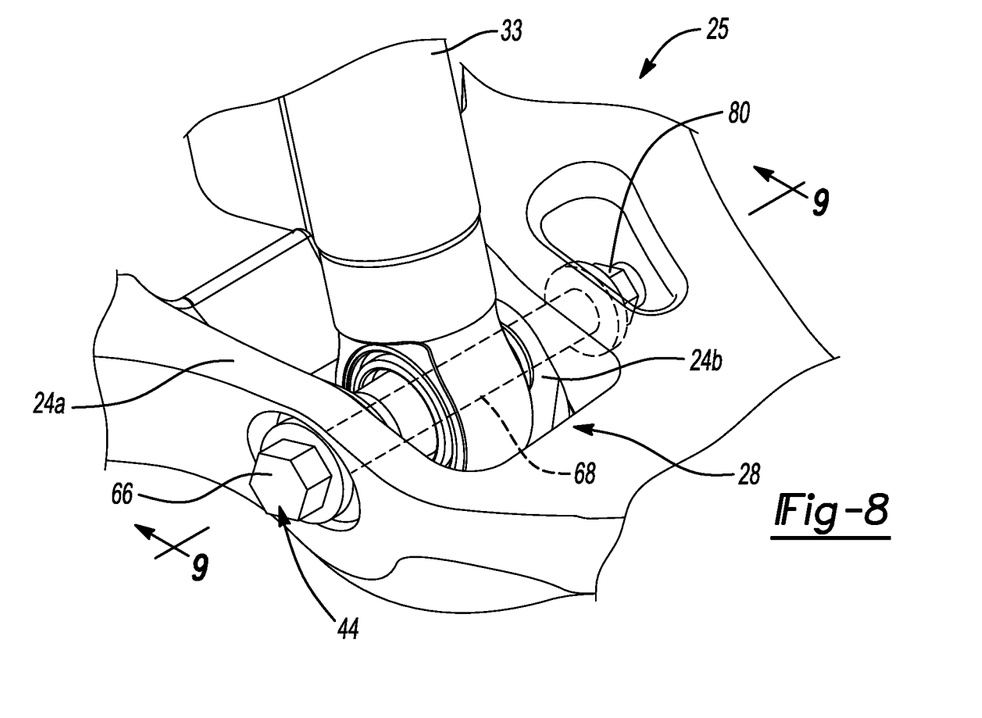
FIG. 8 is a partial perspective view of the control arm showing a nut attached to the fastener.

Finally, as shown in FIGS. 8 and 9, the nut 80 is threadably engaged to the threaded portion 72a of the shaft 68. As the nut 80 is being torqued onto the shaft 68, the sleeve 42 may slide in an axial direction X1 relative to the control arm 25, which in turn, forces the bushing 40 against the control arm 25. The force required to accomplish this is substantially less than the force required to clamp the control arm down on the bushing in conventional systems.

One of the advantages of the fastener assembly 32 of the present disclosure is that the fastener assembly 32 is able to manage service load requirements of larger vehicles without increasing the size of the fastener assembly 32.

What is claimed is:

1. A vehicle comprising:
a first vehicle component having a first side defining a first opening and a second side opposite the first side defining a second counter sunk opening;
a second vehicle component disposed between the first and second sides of the first vehicle component; and
a fastener assembly attaching the first and second vehicle components to each other, the fastener assembly including a sleeve, a bushing, and a fastener, the sleeve disposed within the first opening of the first vehicle component, the bushing extending through the second vehicle component and disposed between the first and second sides of the first vehicle component, and the fastener extending through the sleeve, the bushing and the first and second openings of the first vehicle component,
wherein the bushing has a first axial end surface and a second axial end surface, the first axial end surface is tapered to correspond to a tapered surface of the counter sunk second opening and the second axial end surface includes serrations that grip a first axial end surface of the sleeve.

2. The vehicle of claim 1, wherein the sleeve is pressed in the first opening of the first vehicle component.

3. The vehicle of claim 1, wherein the first opening of the first vehicle component has a diameter that is greater than a diameter of the second opening of the first vehicle component.

4. The vehicle of claim 1, wherein the sleeve is made of a metal material.

5. The vehicle of claim 1, wherein the first axial end surface of the sleeve extends into a space defined between the first and second sides of the first vehicle component.

6. The vehicle of claim 1, wherein the first vehicle component is a control arm and the second vehicle component is a shock.

7. The vehicle of claim 1, wherein the fastener includes a head and a shaft extending from the head, and wherein the head abuts against a second axial end surface of the sleeve.

8. The vehicle of claim 1, wherein an outer diameter of the sleeve is substantially equal to an outer diameter of the bushing.

9. A method for assembling a first vehicle component and a second vehicle component to each other, the method comprising:
positioning the second vehicle component between a space defined by first and second sides of the first vehicle component, the first side of the first vehicle component includes a first opening and the second side of the first vehicle component includes a second counter sunk opening;
inserting a bushing through the first opening in the first side of the first vehicle component and through the second vehicle component;
pressing a sleeve into the first opening in the first side of the first vehicle component after the bushing is inserted through the first opening and through the second vehicle component; and
inserting a fastener through the sleeve, the bushing, the first opening and the second counter sunk opening in the second side of the first vehicle component,
wherein the bushing has a first axial end surface and a second axial end surface, the first axial end surface is tapered to correspond to a tapered surface of the second counter sunk opening and the second axial end surface includes serrations that grip a first axial end surface of the sleeve.

10. The method of claim 9, wherein the first opening of the first vehicle component has a diameter that is greater than a diameter of the second opening of the first vehicle component.

11. The method of claim 9, wherein the first vehicle component is a control arm and the second vehicle component is a shock.

12. The method of claim 9, wherein an outer diameter of the sleeve is substantially equal to an outer diameter of the bushing.

13. The method of claim 9, wherein the first axial end surface of the sleeve extends into the space defined between the first and second sides of the first vehicle component.

14. The method of claim 9, wherein the fastener includes a head and a shaft extending from the head, and wherein the head abuts against a second axial end surface of the sleeve.

* * * * *